Oct. 24, 1939.   F. H. FODOR   2,176,897
ELECTROMAGNETIC CONTROL DEVICE
Filed Sept. 28, 1938   2 Sheets-Sheet 1

Inventor
FERENZ H. FODOR,
By
Attorney

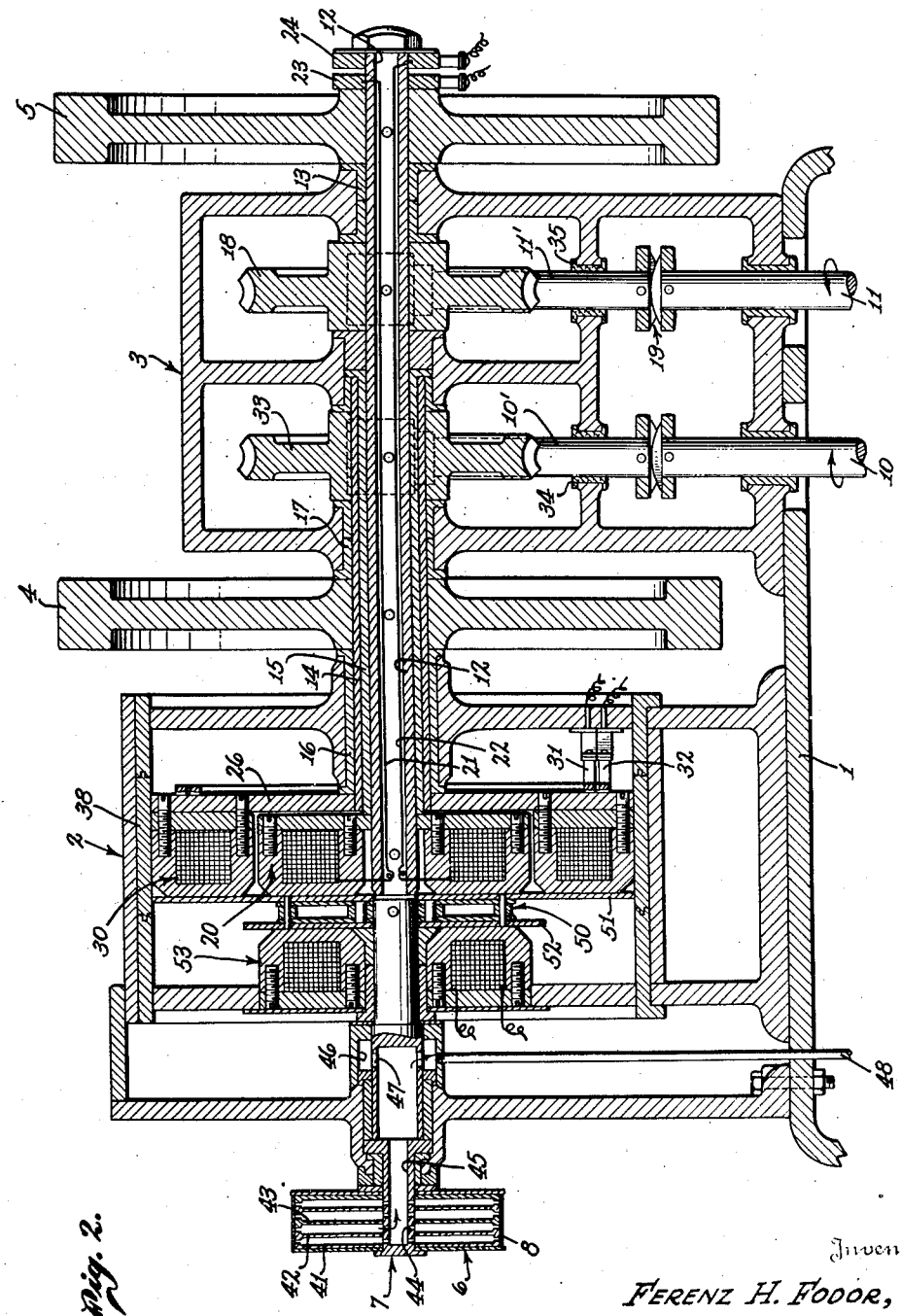

Patented Oct. 24, 1939

2,176,897

UNITED STATES PATENT OFFICE 2,176,897

ELECTROMAGNETIC CONTROL DEVICE

Ferenz H. Fodor, Los Angeles, Calif., assignor to Regan-Day, Inc., Los Angeles, Calif., a corporation of California Application September 28, 1938, Serial No. 232,137

12 Claims. (Cl. 192—4)

This invention pertains to methods and means of controllably regulating the rotation of driven members. It is particularly directed to means whereby two continuously driven members rotating in opposite directions may be caused to selectively energize and actuate a driven member in any desired direction. The means for accomplishing this result are adapted for use in the handling of strip film, in the operation of various control devices, in adjusting and positioning tools, levers, gear changing devices, speed changers, belts, milling tools, grinding equipment, valves, etc. The driven member, controlled by the invention hereafter described, may be employed in the performance of numerous useful functions.

In its more specific embodiment it may be stated that the invention contemplates a combination of elements whereby the two continuously driven members rotating in opposite directions are provided with electromagnetic means whereby they may be selectively coupled to a driven member. Means are also provided for braking or momentarily stopping the driven member whenever a reversal in its direction of rotation is being accomplished so that the driven member may be reversed quickly and smoothly and without slippage or undue strain upon mechanism or devices attached thereto, even though such delicate devices as strip film are so employed.

The invention therefore contemplates a combination of elements and an electrical circuit whereby a braking coil is energized momentarily whenever a change is made from one electromagnetic coil to another of a clutch combination.

An object of the invention is to disclose and provide means for regulatably reversing the direction of rotation of a driven member.

Another object is to provide means whereby the direction of rotation of a driven member may be changed at will, driving force being continuously supplied from two driving shafts continuously rotating in opposing directions.

A further object of the invention is to provide means for selectively applying rotative force from either of two continuously driven rotating members rotating in opposite directions to one or more driven members.

A still further object is to provide an electrical circuit including means for controlling an electromagnetic clutch and brake in such manner as to momentarily apply the brake whenever a change is made in the clutch.

Another object is to provide a simple, compact form of construction for a device whereby the direction of rotation of a driven element may be changed by electromagnetic means.

These and other objects, uses, advantages and adaptations of the invention will become apparent to those skilled in the art from the following detailed description of certain preferred forms of the invention, reference being had to the appended drawings to show such illustrative forms.

In these drawings:

Fig. 2 is an enlarged vertical section of the device shown in Fig. 1.

Figure 1:
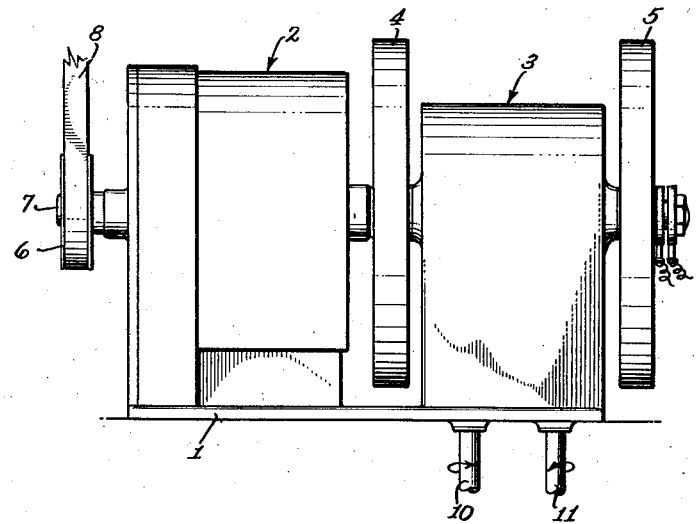
Fig. 1 is a side elevation of one form of device.

By referring to Fig. 1 it will be seen that the device comprises a base 1 upon which is mounted a coil or clutch housing 2 and a drive or gear housing 3. Fly wheels are indicated at 4 and 5. A driven member, in this instance a drum 6, is shown upon the driven shaft 7 protruding from a forward housing 2.

The drum 6 may be associated with any suitable device which it is desired to drive, manipulate or control. For purposes of illustration, a film 8 is shown passing over the drum 6. Driven shafts 10 and 11 from motors, not shown, enter the gear housing 3, these shafts 10 and 11 rotating in opposite directions.

The essential portions of the device comprise a long hollow shaft 12 journaled in a suitable bearing 13 of the gear housing 3. Concentric therewith is another hollow shaft 14. The outer shaft 14 is shorter in length than the inner hollow shaft 12. A sleeve-type bearing 15 may be fitted between the two hollow shafts 12 and 14. The hollow shaft 14 is held within a suitable bearing 16 of the clutch housing 2 and a bearing 17 of the gear housing 3. The inner hollow shaft 12 carries a worm wheel 18 which engages with a worm mounted upon the driven shaft 11'. Suitable flexible couplings, indicated at 19, may be inserted between the shaft portions 11 and 11'. Since the shaft 11 is continuously rotated, the inner hollow shaft 12 is also continuously rotated. The fly wheel 5 is pinned or otherwise carried by the hollow shaft 12. An electromagnetic coil, generally indicated at 20, is carried by one end of the hollow shaft 12. The coil 20 will hereafter be referred to as the central coil and may include suitable Norwegian iron housings carried by a transverse disc mounted upon the hollow shaft. The wiring of the coil 20 extends into the hollow shaft as indicated at 21 and 22, the wires then extending longitudinally along the shaft to collector rings 23 and 24 respectively. Brushes acting upon such collector rings may supply electrical energy to the coil during rotation of the shaft 12.

The end of the outer shorter hollow shaft 14 is also provided with an annular disc 26 which carries an outer coil adapted to act as an electromagnet, this coil being indicated generally at 30. This coil may be in the form of a ring or segments of an annulus. Electrical energy may be supplied to such coil 30 by means of brushes 31 and 32 acting upon contact rings carried by the rear face of the disc 26 and electrically associated with the ends of the wires from which the coil 30 is made. It is to be understood that each of the coils 20 and 30 may consist of one or more coils, and that a series of coils may be mounted on the disc 26 instead of a single large coil. The word "coil", as used herein, therefore, refers to any electromagnetic coil means adapted to act upon the clutch and brake plate elements hereinafter described.

Preferably the operative faces of the electromagnetic coils 20 and 30 lie in a single transverse plane. The housings for the coils may be of a split type if desired. When they are to be positioned as shown, with working faces in a transverse plane, such coil housings are preferably provided with milled or ground and polished faces.

The outer shorter hollow shaft 14 carries the worm gear 33 which is driven by means of a worm mounted upon the shaft 10', the shaft 10' being continuously driven by the shaft 10 and by a motor, not shown, in a direction opposed to that of the direction of rotation of the shaft 11. The fly wheel 4 is also mounted upon the outer hollow shaft 14, thereby acting as a means for governing the speed of rotation and resisting variations in rate of rotation.

Attention may be called at this time to the fact that the gear housing 3 may be provided with a transverse partition and with gaskets 34 and 35, thereby permitting the entire housing to be filled with lubricant.

In view of the fact that the outer drive coil 30 may be of appreciable weight, the housing 2 is provided with a circular bearing sleeve or removable liner 38, the outer diameter of the ring coil 30 being correlated to the internal diameter of the liner bearing 38 so that a sliding fit is obtained. The tendency for centrifugal force and rotational speed to warp the member 26 or to displace the effective face of the electromagnetic coil 30, is thus obviated.

The driven shaft is preferably axially positioned with respect to the two hollow shafts and such driven shaft is generally indicated at 7. The driven shaft may be provided with any suitable magnet, disc, drum, cam, gear, or the like. In the embodiment of the invention shown, the driven shaft 7 is shown provided with a film drum consisting of a plurality of spaced discs or wheels 41, 42, 43, etc., adapted to support a film. Strip film is caused to adhere to such drum by reason of suction, the suction being applied by means of radial perforations, such as the perforations 44 extending into the bore 45 formed in the driven member 7, the bore 45 being then in communication with an annular chamber 46 by means of ports 47. The annular chamber 46 may be in constant communication with an air pump or other source of vacuum by means of the line 48. In order to prevent axial movement of the driven member 7, it may be provided with portions differing in outer diameter, the steps thus formed cooperating with bearing elements carried by the frame 39, such bearing elements facilitating rotation but resisting axial movement of the driven member 7.

The driven member 7 is provided with a plate element adapted to cooperate with the faces of the electromagnetic coils 20 and 30. The plate element shown in the drawings comprises a spider 50 firmly mounted on the end of the driven member 7, the spider carrying a driving disc or plate element 51 and a smaller plate element 52. The smaller plate element 52 is adapted to cooperate with an annular braking coil, generally indicated at 53, this braking coil being stationary and permanently attached to the frame or body of the device.

Attention is called to the fact that in actual operation only very minute clearances need separate the surfaces of the plate elements 51 and 52 from the surfaces of the electromagnetic coils 20, 30 and 53. Clearances on the order of 0.005 inch have been found to be satisfactory. Since the end of driven member 7 can abut the hollow driving shaft 12 and because of the sliding fit of the parts, very little, if any, axial movement can take place. The plates 51 and 52 are preferably of metal susceptible to magnetic influence but not magnetizable to an appreciable extent. Hard Norwegian iron is satisfactory.

Figure 3:
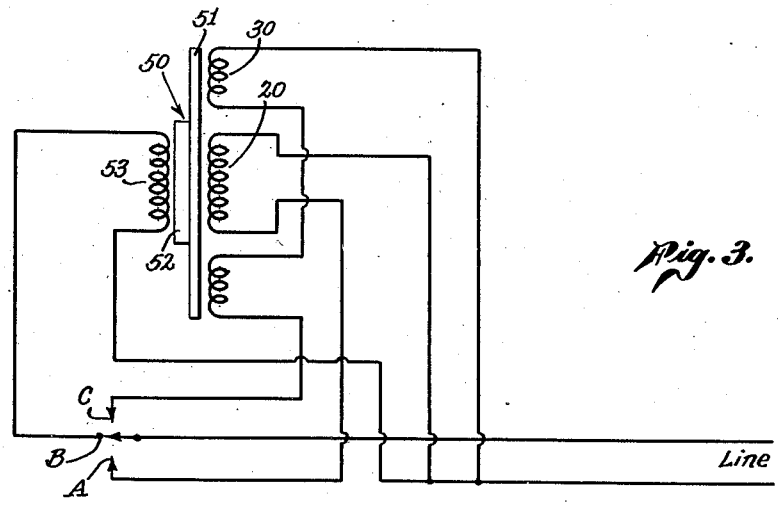
Fig. 3 is a wiring diagram.

By now referring to Fig. 3 in which certain of the coils are shown diagrammatically, it will be noted that the disc-like or central electromagnetic coil 20 mounted upon the hollow shaft 12 can be energized by closing contact A. Shaft 12, however, revolves in a counterclockwise direction at all times and therefore as long as contact A is closed, the driven element 40 will also revolve in a counterclockwise direction. If, however, it is desired to reverse the direction of rotation of the driven element 40, the switch would have to be moved so as to close the contact C. In moving from A to C (Fig. 3), contact would be made with the point B and when such contact is made the braking coil 53 is energized, acting upon the plate elements 52 and 51 and stopping the rotation of the driven element for a brief instant. When contact is made with point C, then the outer coil 30 is energized and since this coil is mounted on the outer hollow shaft 14 which is continuously driven in a clockwise direction, the electromagnetic coil 30 will exert its effect upon the plates 52, 51, and cause the driven element to now rotate in a clockwise direction. The brief interval during which the braking coil had been applied has been sufficient, however, to permit reversal in the direction of rotation of the driven member without undue slippage, jarring or other irregularities, so that a positively controlled reversal can take place at any time by the use of the method herein disclosed.

It will be seen, therefore, that all coils are connected to one side of the line at all times, the key or switch being so arranged as to close the circuit to the braking coil when in neutral position and whenever a reversal in direction of drive is desired. Furthermore, it will be noted that the arrangement and combination of elements permits ready adjustment or replacement of the various parts to be made without disturbing the remaining portions of the machine. For example, the gear housing 3 can be opened and even removed from the base 1 without unnecessarily disturbing the contents of the clutch housing. Minor details of construction have not been described, it being understood that numerous changes, modifications and adaptations can be made without departing from the invention. When the device is used in the control of gear changers, valves, etc., it may not be necessary to employ a hollow driven member nor need the invention be limited to a single driven member, since the apparatus may be used in controlling a number of driven members. The drive and brake coils may be of different shapes and sizes and can occupy different positions. All modifications and changes coming within the scope of the appended claims are embraced thereby.

I claim:

1. In a machine for reversing the direction of rotation of a driven element, the combination of a pair of coaxial hollow shafts, the outer shaft being shorter than the inner shaft, a central electromagnetic coil surrounding and attached to one end of the inner shaft, means for rotating said shaft in one direction, an outer electromagnetic coil carried by one end of the outer shorter shaft, said outer coil being adapted to surround said central coil, means for rotating said shorter outer shaft in the opposite direction; a driven shaft in axial alignment with said hollow shafts, a metal plate mounted on said driven shaft in operative relation to said central and outer coils, stationary electromagnetic means adapted to selectively act upon said plate to stop the same, and an electrical circuit adapted to momentarily energize said stationary electromagnetic means prior to supply of energy to either the central or outer coils.

2. In a machine for regulatably reversing direction of rotation of a driven member, the combination of: a pair of concentrically disposed electromagnetic coils, means for continuously rotating one of said coils in one direction and for rotating the other coil in the opposite direction; a driven member axially positioned with respect to said coils, a metal plate element carried by said driven member in operable relation to the effective face of the coils, a stationary braking coil in operable relation to said plate, and circuit means for momentarily energizing said braking coil prior to supply of energy to either of said concentric driving coils.

3. In a machine for regulatably reversing direction of rotation of a driven member, the combination of: a pair of concentrically disposed electromagnetic coils adapted to present a working face substantially tranverse to axes of rotation of said coils, means for continuously rotating one of said coils in one direction and for rotating the other coil in the opposite direction; a driven member axially positioned with respect to said coils, a metal plate element carried by said driven member in operable relation to the effective face of the coils, a stationary braking coil in operable relation to said plate, and circuit means for momentarily energizing said braking coil prior to supply of energy to either of said concentric driving coils.

4. In a machine for regulatably reversing direction of rotation of a driven member, the combination of: a pair of coaxial hollow shafts, the outer shaft being shorter than the inner shaft, a central electromagnetic coil surrounding and attached to one end of the inner shaft, means for supplying electrical energy to said coil through said shaft, means for continuously rotating the shaft in one direction; an outer electromagnetic coil carried by one end of the outer shorter shaft, said outer coil being adapted to surround said central coil, a bearing sleeve between said inner and outer hollow shafts, means for continuously rotating said shorter outer shaft in the opposite direction; a driven shaft in axial alignment with said hollow shafts, a metal plate mounted on said driven shaft in operative relation to said central and outer coils, a stationary electromagnetic braking coil adapted to selectively act upon said plate to stop the same, and an electrical circuit means for momentarily energizing said braking coil prior to supply of energy to either of said driving coils.

5. In a machine for regulatably reversing direction of rotation of a driven member, the combination of: a pair of concentrically disposed electromagnetic coils, directly coupled means for continuously rotating one of said coils in one direction and for rotating the other coil in the opposite direction; a driven member axially positioned with respect to said coils, a metal plate element carried by said driven member in operable relation to the effective face of the coils, a stationary braking coil in operable relation to said plate, and circuit means for momentarily energizing said braking coil prior to supply of energy to either of said concentric driving coils.

6. In a machine of the character described, the combination of: a pair of coaxial hollow shafts, a central electromagnetic coil carried by the inner hollow shaft, electrical conductors extending through said inner hollow shaft to said central coil, an outer electromagnetic coil carried by the outer hollow shaft, said coils being concentrically disposed; means directly coupled to said shafts for rotating them in opposite directions; a driven member in axial alignment with said shafts, a metal plate element carried by said driven member in close proximity to the effective face of said coils, and bearing means for preventing movement of said driven element in an axial direction.

7. In a machine of the character described, the combination of: a pair of coaxial hollow shafts, a central electromagnetic coil carried by the inner hollow shaft, electrical conductors extending through said inner hollow shaft to said central coil, an outer electromagnetic coil carried by the outer hollow shaft, said coils being concentrically disposed; means directly coupled to said shafts for rotating them in opposite directions; a driven member in axial alignment with said shafts, a metal plate element carried by said driven member in close proximity to the effective face of said coils, bearing means for preventing movement of said driven element in an axial direction, a stationary braking coil in operable relation to said plate element, and an electrical circuit connecting said central and outer coils and said braking coil for the selective supply of energy to said coils.

8. In a machine of the character described, the combination of: a pair of coaxial hollow shafts, a central electromagnetic coil carried by the inner hollow shaft, electrical conductors extending through said inner hollow shaft to said central coil, an outer electromagnetic coil carried by the outer hollow shaft, said coils being concentrically disposed; means directly coupled to said shafts for rotating them in opposite directions; means for resisting variation in rate of rotation carried by each hollow shaft; a driven member in axial alignment with said shafts, a metal plate element carried by said driven member in close proximity to the effective face of said coils, and bearing means for preventing movement of said driven element in an axial direction.

9. In a machine of the character described, the combination of: a base; a movably positionable gear housing mounted on said base; a movably positionable clutch housing mounted on said base; a pair of coaxial hollow shafts journaled in said gear and clutch housings; means within said gear housing for driving said hollow shafts in opposing directions; a central electromagnetic coil carried by one end of the inner hollow shaft in said clutch housing; a disc carried by the outer hollow shaft in said clutch housing; electromagnetic coil means carried by said disc and surrounding said central coil; a driven member journaled in and extending from the clutch housing in axial alignment with said hollow shafts; and a plate member mounted on said driven member and in operable relation to said coils.

10. In a machine of the character described, the combination of: a base; a movably positionable gear housing mounted on said base; a movably positionable clutch housing mounted on said base; a pair of coaxial hollow shafts journaled in said gear and clutch housings; means within said gear housing for driving said hollow shafts in opposing directions; a central electromagnetic coil carried by one end of the inner hollow shaft in said clutch housing; a disc carried by the outer hollow shaft in said clutch housing; electromagnetic coil means carried by said disc and surrounding said central coil, a sleeve bearing carried by said clutch housing and surrounding said disc and electromagnetic coil; a driven member journaled in and extending from the clutch housing in axial alignment with said hollow shafts, and a plate member mounted on said driven member and in operable relation to said coils.

11. In a machine of the character described, the combination of: a base; a movably positionable gear housing mounted on said base; a movably positionable clutch housing mounted on said base; a pair of coaxial hollow shafts journaled in said gear and clutch housings; means within said gear housing for driving said hollow shafts in opposing directions; a central electromagnetic coil carried by one end of the inner hollow shaft in said clutch housing; a disc carried by the outer hollow shaft in said clutch housing; electromagnetic coil means carried by said disc and surrounding said central coil; collector rings carried by said plate, said rings being electrically associated with the coil carried by said plate; and means extending through the inner hollow shaft for supplying electrical energy to said central coil.

12. In a machine of the character described, the combination of: a base; a movably positionable gear housing mounted on said base; a movably positionable clutch housing mounted on said base; a pair of coaxial hollow shafts journaled in said gear and clutch housings; means within said gear housing for driving said hollow shafts in opposing directions; a central electromagnetic coil carried by one end of the inner hollow shaft in said clutch housing; a disc carried by the outer hollow shaft in said clutch housing; electromagnetic coil means carried by said disc and surrounding said central coil; collector rings carried by said plate, said rings being electrically associated with the coil carried by said plate; means extending through the inner hollow shaft for supplying electrical energy to said central coil; a driven member journaled in and extending from the clutch housing in axial alignment with said hollow shafts, a plate member mounted on said driven member and in operable relation to said coils; a stationary braking coil in operable relation to said plate member; and an electrical circuit connecting said braking coil, central coil and electromagnetic coil means for selectively supplying energy to said coils.

FERENZ H. FODOR.